E. M. Day,
Game Trap.

No. 97,747. Patented Dec. 7, 1869.

Witnesses.
Inventor:
Edwin M. Day
by Prindle and Dyer, Attys

United States Patent Office.

EDWIN M. DAY, OF ELKHART, ILLINOIS.

Letters Patent No. 97,747, dated December 7, 1869.

IMPROVED GAME-TRAP.

The Schedule referred to in these Letters Patent and making part of the same.

*To all whom it may concern:*

Be it known that I, EDWIN M. DAY, of Elkhart, in the county of Logan, and in the State of Illinois, have invented a new and useful Game-Trap; and do hereby declare that the following is a full, clear, and exact description thereof, reference being had to the accompanying drawing, making a part of this specification, in which—

Letters of like name and kind refer to like parts in each of the figures.

My invention relates to a class of devices, having for its object the entrapping of small animals; and It consists in the peculiar construction and arrangement of the various parts of the trap, by means of which, each animal that is caught therein is caused to set the trap again, and prepare the same for the reception of other animals, as is hereinafter set forth.

In the annexed drawing—

A represents a box, enclosed at all points, except its front end B.

Swinging from or upon suitable shafts, C, D, and E, journaled within the sides of the box, and extending horizontally across the same, are three latticed doors, C', D', and E', respectively, the first of which, C', is placed at the open end of the trap, and prevented from swinging inward, by means of suitable lugs *a*, secured to the lower side of said box, and from swinging outward by means of a spring-catch, F, secured to the bottom of said box, and engaging with the lower edge of the door.

The second and third doors, D' and E', swing only to the front, being prevented from swinging to the rear by means of suitable detents, attached to the sides or bottom of the box, or by being of a sufficient length to strike, at their lower edges, upon the bottom of said box, before reaching a vertical position.

Two openings, G, having a sufficient size to permit of the passage of the animal, which it is designed to trap, are provided in and through the sides of the box A, in rear of the door E', and are each closed, when desired, by means of an edgewise-swinging door, H, secured to the shaft I, journaled within the sides of said box, and extending horizontally across the same.

Secured to, and resting upon the shaft I, is a semicircular trough, K, enclosed at either end, and containing a metal ball, L, which, while permitted to roll freely lengthwise of said trough, is prevented from becoming accidentally removed therefrom, by means of a hoop, *k*, having a semicircular form, which is secured, at its ends, to the sides of said trough, at its centre, lengthwise.

Figure 1:
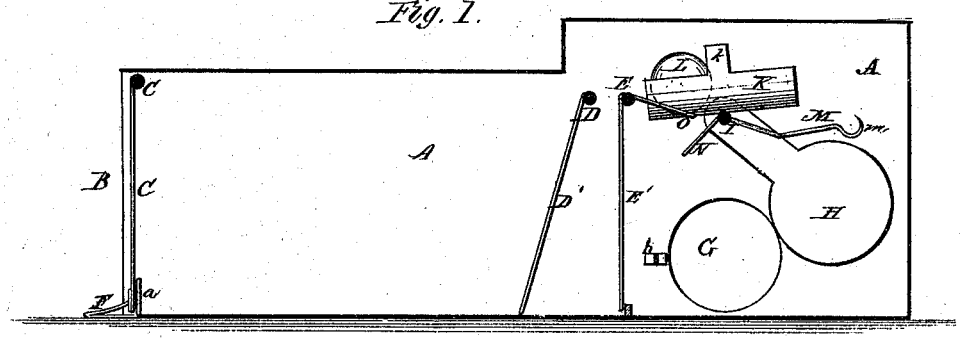
Figure 1 is a vertical longitudinal section of my improved device.
Figure 2:
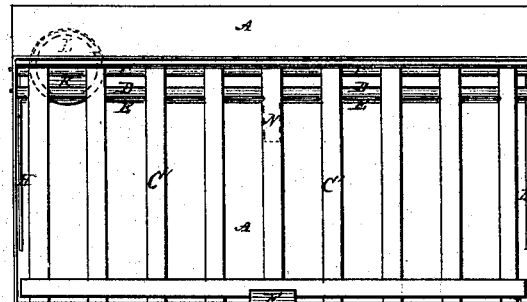
Figure 2 is a front elevation of the same.

The trough K is so adjusted upon the shaft I as to incline slightly downward to the front, when the doors H are raised, as shown in fig. 1, in which position the ball L rolls to the forward end of said trough, and, by its weight, holds said doors in place.

If, now, the shaft I be rotated slightly, so as to cause the trough to incline downward to the rear, the ball L will immediately roll to the opposite end of the latter, and, by its weight, revolve said shaft still further, or until the doors have entirely closed the openings G, and strike against suitable detents *h*, secured to the sides of the box.

In order that the animal entering through the opening G may be caused to close the same, an arm, M, is secured to, and extends horizontally to the rear from the centre of the shaft I, when the trap is set, as in fig. 1.

A hook, *m*, upon the end of the arm M, permits the attachment thereto of any suitable bait, which the animal attempts to remove, by pulling downward, by which means, the position of the trough is sufficiently changed to cause the ball to roll to the rear and close the doors.

In its efforts to escape, the animal now presses forward toward the light at the open end, and, by raising the doors D' and E', advances as far as the outer door C', said doors D' and E' meanwhile swinging downward and rearward, as soon as released, and preventing its return.

It being desirable that each animal, as caught, should set the trap, an arm, N, is secured to the shaft I, and extends horizontally forward, when the trap is sprung, and the opening G closed, in which position, said arm rests against, and immediately beneath a similar arm, O, extending horizontally rearward from the shaft E, when the door E' is closed.

As thus arranged, if the door E' be raised, the arm O, pressing downward upon the arm N, rotates the shaft I sufficiently to open the doors H', and cause the ball L to roll to the forward end of the trough, by which means, the trap is in readiness to receive and trap another animal.

By the use of this device, a number of animals, only limited by the capacity of the box between the doors C' and D', may be trapped, with no more care or attention than is required to secure one animal by other traps, which must be reset after the capture of each animal.

Having thus fully set forth the nature and merits of my invention,

What I claim as new, and desire to secure by Letters Patent, is—

The doors H, secured to, and revolving with the shaft I, and operated by means of the trough K, the ball L, and the arm M, substantially as and for the purpose specified.

Also, the means employed for resetting the trap, consisting of the door E', the shaft E, and the arms O and N, in combination with the above-claimed devices, substantially as herein described.

Also, the hereinbefore-described animal-trap, consisting of the box A, provided with the open end B, and with the openings G, the swinging doors C', D', and E', and H, the shaft I, the trough K, the ball L, and the arms M, N, and O, all constructed and arranged substantially as and for the purpose specified.

In testimony that I claim the foregoing, I have hereunto set my hand and seal, this 12th day of October, 1869.

E. M. DAY. [L. S.]

Witnesses:
  GEO. O. MARCY,
  L. A. HILL.